United States Patent [19]
Yamamoto

[11] Patent Number: 5,803,441
[45] Date of Patent: Sep. 8, 1998

[54] DAMPER MECHANISM WITH UNDULATED RIBBON-LIKE SPRING HAVING MEANS FOR RESTRICTING RADIAL MOVEMENT OF THE SPRING

[75] Inventor: Kozo Yamamoto, Daitou, Japan

[73] Assignee: Exedy Corporation, Osaka, Japan

[21] Appl. No.: 631,197

[22] Filed: Apr. 12, 1996

[30] Foreign Application Priority Data

| Apr. 21, 1995 | [JP] | Japan | 7-097293 |
| Apr. 21, 1995 | [JP] | Japan | 7-097294 |
| Apr. 25, 1995 | [JP] | Japan | 7-101501 |

[51] Int. Cl.[6] .................. F16D 3/12; F16D 3/80
[52] U.S. Cl. .............. 267/165; 464/24; 464/84; 464/101; 267/136
[58] Field of Search .................. 267/165, 164, 267/136; 464/24, 81, 84, 100, 101, 51, 54; 192/106.1; 74/574

[56] References Cited

U.S. PATENT DOCUMENTS 5,562,541 10/1996 Fukushima .................. 464/24
5,562,543 10/1996 Rohrle ....................... 464/68

FOREIGN PATENT DOCUMENTS

| 4336178 | 4/1994 | Germany | 464/24 |
| 43 41 374 | 6/1994 | Germany . | |

*Primary Examiner*—Peter M. Poon
*Attorney, Agent, or Firm*—Shinjyu Office of Patent Attorney

[57] ABSTRACT

To reduce a frictional resistance generated between undulated ribbon-like springs and outer circumferential walls, a flywheel assembly is composed of a first flywheel 1, a second flywheel 3 and ribbon-like springs 18. A fluid chamber 17 is formed between the second flywheel 3 and the first flywheel 1. The undulated ribbon-like spring 18 is disposed within the fluid chamber 17. In one embodiment, a projecting ring portion 20*a* that projects beyond the other ring portions 20 is provided so as to contact with an outer circumferential portion 7*a* of the fluid chamber 17 in order to prevent the remainder of the spring from contacting the portion 7*a* of the chamber 17. In another embodiment, a mid-portion of the undulated ribbon-like spring is confined to restrict radially outward movement by a plate and axially aligned pins which prevent radial movement of portions of the spring.

4 Claims, 16 Drawing Sheets

DAMPER MECHANISM WITH UNDULATED RIBBON-LIKE SPRING HAVING MEANS FOR RESTRICTING RADIAL MOVEMENT OF THE SPRING

BACKGROUND OF THE INVENTION

A. Field of the Invention

The present invention relates to an undulated ribbon-like spring and a damper mechanism using the undulated ribbon-like spring. Specifically, the invention relates to means for restraining radial movement of an undulated ribbon-like spring in a damper mechanism.

B. Description of Related Art

Damper mechanisms for absorbing a torque fluctuation of an engine in automotive applications are well known. Damper mechanisms are typically connected to an engine and are interposed between the engine and a transmission attached to the engine. The damper mechanism is typically incorporated in a clutch disc assembly or a flywheel assembly. The damper mechanism includes an input member and an output member which are rotatable relative to each other, coil springs disposed for limiting the rotation of both members when the two members are rotated relative to each other, and a resistance generating mechanism for generating frictional resistances or viscous resistance when the two members are rotated relative to each other.

A large space is required in the circumferential direction and in the axial direction within the damper mechanism due to the size of the coil springs. It is therefore difficult to incorporate the above-described damper mechanism into a front-wheel drive type vehicle where the space in the axial direction is limited.

Recently an undulated ribbon-like spring has been employed in damper mechanisms replacing coil springs. The ribbon-like springs are used instead of the coil springs to reduce the space typically used by coil springs. Undulated ribbon-like springs are made by bending an elongated thin plate members, having a constant width, into a wavy or serpentine manner. The undulated ribbon-like springs are disposed in arcuate chambers defined by the input member and output member, for transmitting a torque from the input member to the output member. The undulated ribbon-like springs are extended and compressed when the input and output members are rotated relative to each other. As a result, in the case where a torsional vibration is transmitted to the input member, the undulated ribbon-like springs are repeatedly extended and compressed, and the oil which is filled in, for example, the arcuate chamber is caused to flow between portions of undulated ribbon-like spring and the wall surfaces of the arcuate chambers to thereby generate a predetermined viscous resistances. As a result, the torsional vibration may be attenuated.

In general, the various components of a damper mechanism may be divided into two portions, for vibration analysis. The two portions include input mechanism components and the output mechanism components. The input mechanism components and the output mechanism components are divided by the spring or elastic member. It is desirable for the moment of inertia of the output mechanism components to be large so that the resonance frequency is shifted in a range equal to or less than an idle RPM of the engine. In this case, for the fine vibration generated in the practical range of the engine RPM, the countermeasure that the frictional resistances (or viscous resistances) are decreased is effective in attenuation of vibration.

In the damper mechanism using the undulated ribbon-like springs, as the undulated ribbon-like springs are compressed, folded portions on the outer circumferential side of the undulated ribbon-like springs are urged to slide on and along the outer circumferential walls of the arcuate chambers. In this case, as the displacement angle is increased, the frictional resistances generated in this situation are increased. In particular, the undulated ribbon-like springs as a whole are moved toward the outer circumferential walls by the centrifugal forces, so that the frictional resistances are increased. The occurrence of such frictional resistances make attenuation of vibrations generated in the practical range of the engine RPM very difficult.

Further, the undulated ribbon-like springs have a large elastic energy per unit volume. Therefore, it is possible to reduce the width of the springs while keeping a sufficient torque transmission capacity. Furthermore, by the using undulated ribbon-like springs, it is possible to obtain a wide relative displacement angle between the input and output members. However, the rigidity of the undulated ribbon-like springs in some applications may not be sufficiently low and the displacement angle between the input and output members may not be sufficiently wide. Therefore, the may be some configurations in which the torsional vibration may not be properly attenuated.

SUMMARY OF THE INVENTION

One object of the present invention is to reduce the friction resistances generated by sliding contact between an undulated ribbon-like springs and the outer circumferential walls of a damper mechanism.

Another object of the present invention is to provide a damper mechanism using undulated ribbon-like springs with enhanced low rigidity and the wider displacement angle features.

According to one aspect of the present invention, a damper mechanism includes an input plate and an output plate coupled to the input plate for limited rotary displacement therewith, the input plate and the output plate at least partially defining an annular fluid chamber. An undulated ribbon-like spring is disposed in the annular fluid chamber, the undulated ribbon-like spring being disposed between the input and output plates damping vibrations therebetween in response to relative rotary displacement between the input and output plates. Further, the damper mechanism includes a means for restraining radially outward movement of the undulated ribbon-like spring whereby the restraining means limits contact between the undulated ribbon-like spring and a circumferentially outer surface of the annular chamber in response to centrifugal forces and compressive forces acting on the undulated ribbon-like spring.

In one embodiment of the present invention, the undulated ribbon-like spring includes an elongated strip of material shaped to form a plurality of first ring portions, second ring portions and a plurality of lever portions, the lever portions extending between the first and second ring portions. In this embodiment, each of the second ring portions on one edge of the undulated ribbon-like spring are generally aligned to define an outer circumferencial edge of the undulated ribbon-like spring. Further, the restraining means includes at least one of the first ring portions, the first ring portions extending radially outward beyond the outer circumferencial edge of the undulated ribbon-like spring to engage the circumferentially outer surface of the annular chamber.

Preferably, the undulated ribbon-like spring is formed with one of the first ring portions for each of five of the second ring portions.

In another embodiment of the present invention, the restraining means includes a slider element engaging the circumferentially outer surface of the annular chamber, the slider also engaging at least a portion of the undulated ribbon-like spring.

Preferably, the circumferentially outer surface of the annular chamber is coated with a teflon material.

In another embodiment of the invention, the slider includes at least two rollers engaging the circumferentially outer surface of the annular chamber.

In yet another embodiment of the present invention, the damper mechanism includes a pair of opposing annular plates, the pair of plates disposed within the annular chamber with the undulated ribbon-like spring positioned therebetween. In this embodiment, the restraining means includes at least one pin extending through a portion of the undulated ribbon-like spring and the pair of plates.

Preferably, the pin extends through in inner circumferential portion of the undulated ribbon-like spring.

In another embodiment of the present invention, the damper mechanism further includes an annular plate disposed within the annular chamber with the undulated ribbon-like spring positioned adjacent thereto. In this embodiment, the restraining means includes at least one contact portion formed on the annular plate engaging a radially outward portion of the undulated ribbon-like spring.

In another embodiment of present invention, the damper mechanism further includes at least one pair of axially side by side undulated ribbon-like springs disposed in the annular chamber. In this embodiment, the restraining means includes a coupling member that extends radially between the pair of side by side undulated ribbon-like springs, the coupling member being formed at a first end thereof with a first retainer portion, and a second end thereof with a second retainer portion, the first retainer portions engaging one end of a first of the pair of axially side by side undulated ribbon-like springs and the second retainer portion engaging one end of a second of the pair of axially side by side undulated ribbon-like springs, the first and second retainer portions limiting radial outward movement of pair of axially side by side undulated ribbon-like springs.

In each of the embodiments of the present invention, an axial width of the undulated ribbon-like spring is generally equal to or slightly less than an axial width of the annular fluid chamber. Further, an axial width of the undulated ribbon-like spring is generally half or less than half of a radial width the annular fluid chamber. As well, a radial width of the undulated ribbon-like spring is slightly less than a radial width the annular fluid chamber.

In accordance with another aspect of the present invention, a damper mechanism includes an input plate and an output plate coupled to the input plate for limited rotary displacement therewith, the input plate and the output plate at least partially defining an annular fluid chamber. An undulated ribbon-like spring is disposed in the annular fluid chamber, the undulated ribbon-like spring disposed between the input and output plates damping vibrations therebetween in response to relative rotary displacement between the input and output plates. The undulated ribbon-like spring is in the form of an elongated strip of material shaped to form a plurality of first ring portions, second ring portions and a plurality of lever portions, the lever portions extending between the first and second ring portions, wherein each of the second ring portions on one edge of the undulated ribbon-like spring are generally aligned to define an outer circumferencial edge of the undulated ribbon-like spring and the first ring portions extending radially outward beyond the outer circumferencial edge of the undulated ribbon-like spring to engage the circumferentially outer surface of the annular chamber for restraining radially outward movement of the undulated ribbon-like spring limiting contact between the undulated ribbon-like spring and a circumferentially outer surface of the annular chamber in response to centrifugal forces and compressive forces acting on the undulated ribbon-like spring.

Preferably, the undulated ribbon-like spring has one first ring portion for each of five of the second ring portions.

In another aspect of the present invention, the damper mechanism includes an input plate and an output plate coupled to the input plate for limited rotary displacement therewith, the input plate and the output plate at least partially defining an annular fluid chamber. An undulated ribbon-like spring is disposed in the annular fluid chamber, the undulated ribbon-like spring disposed between the input and output plates damping vibrations therebetween in response to relative rotary displacement between the input and output plates. A slider element engages the circumferentially outer surface of the annular chamber, the slider also engaging at least a portion of the undulated ribbon-like spring for restraining radially outward movement of the undulated ribbon-like spring limiting contact between the undulated ribbon-like spring and a circumferentially outer surface of the annular chamber in response to centrifugal forces and compressive forces acting on the undulated ribbon-like spring..

Preferably, the circumferentially outer surface of the annular chamber is coated with a teflon material.

Alternatively, the slider includes at least two rollers that engage the circumferentially outer surface of the annular chamber.

In accordance with another aspect of the invention, the damper mechanism includes an annular plate disposed within the annular chamber with the undulated ribbon-like spring positioned adjacent thereto having at least one contact portion formed therewith, the contact portion defining the slider.

Alternatively, a plurality of the sliders engage the circumferentially outer surface of the annular chamber, the sliders also engaging the undulated ribbon-like spring at predetermined spaced apart intervals.

In yet another aspect of the present invention, an undulated ribbon-like spring is formed from an elongated metallic strip that is folded in a serpentine manner to define a plurality of first ring portions, second ring portions and a plurality of lever portions. The lever portions extend between the first and second ring portions. Each of the second ring portions on one edge of the undulated ribbon-like spring are generally aligned to define an outer edge of the undulated ribbon-like spring and wherein the first ring portions extend radially outward beyond the outer edge of the undulated ribbon-like spring.

Preferably, the undulated ribbon-like spring includes one first ring portions for each of five of the second ring portions.

In another aspect of the present invention, a damper mechanism includes an input plate and an output plate coupled to the input plate for limited rotary displacement therewith, the input plate and the output plate at least partially defining an annular fluid chamber. An undulated ribbon-like spring is disposed in the annular fluid chamber, the undulated ribbon-like spring disposed between the input and output plates damping vibrations therebetween in response to relative rotary displacement between the input and output plates. A pair of opposing annular plates, the pair of plates disposed within the annular chamber with the undulated ribbon-like spring positioned therebetween. At least one pin extends through a portion of the undulated ribbon-like spring and the pair of plates for restraining radially outward movement of the undulated ribbon-like spring limiting contact between the undulated ribbon-like spring and a circumferentially outer surface of the annular chamber in response to centrifugal forces and compressive forces acting on the undulated ribbon-like spring.

In yet another aspect of the present invention, a damper mechanism includes an input plate and an output plate coupled to the input plate for limited rotary displacement therewith, the input plate and the output plate at least partially defining an annular fluid chamber. At least one pair of axially side by side undulated ribbon-like springs disposed in the annular fluid chamber, the undulated ribbon-like springs disposed between the input and output plates damping vibrations therebetween in response to relative rotary displacement between the input and output plates. A coupling member extends radially between the pair of side by the undulated ribbon-like springs, the coupling member being formed at a first end thereof with a first retainer portion, and a second end thereof with a second retainer portion, the first retainer portions engaging one end of a first of the pair of axially side by side undulated ribbon-like springs and the second retainer portion engaging one end of a second of the pair of axially side by side undulated ribbon-like springs, the first and second retainer portions limiting radial outward movement of pair of axially side by side undulated ribbon-like springs limiting contact between the undulated ribbon-like spring and a circumferentially outer surface of the annular chamber in response to centrifugal forces and compressive forces acting on the undulated ribbon-like spring.

In the damper mechanism according to several aspects of the invention, since the slider or contact portions are engaged with an outer circumferential portion of the undulated ribbon-like springs, it is possible to establish a relatively large displacement angle of the undulated ribbon-like spring.

In the damper mechanism according to the another aspect of the invention, when the torsional vibration is transmitted the coupling member and the pair of undulated ribbon-like springs are repeatedly extended and compressed in the circumferential direction. In this case, since the undulated ribbon-like springs are connected in series with each other in the circumferential direction within each arcuate chamber, the low rigidity may be attained and the displacement angle may be increased to thereby enhance the vibration attenuation characteristics.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

The present invention will now be described with reference to the accompanying drawings.

First Embodiment

Figure 1:
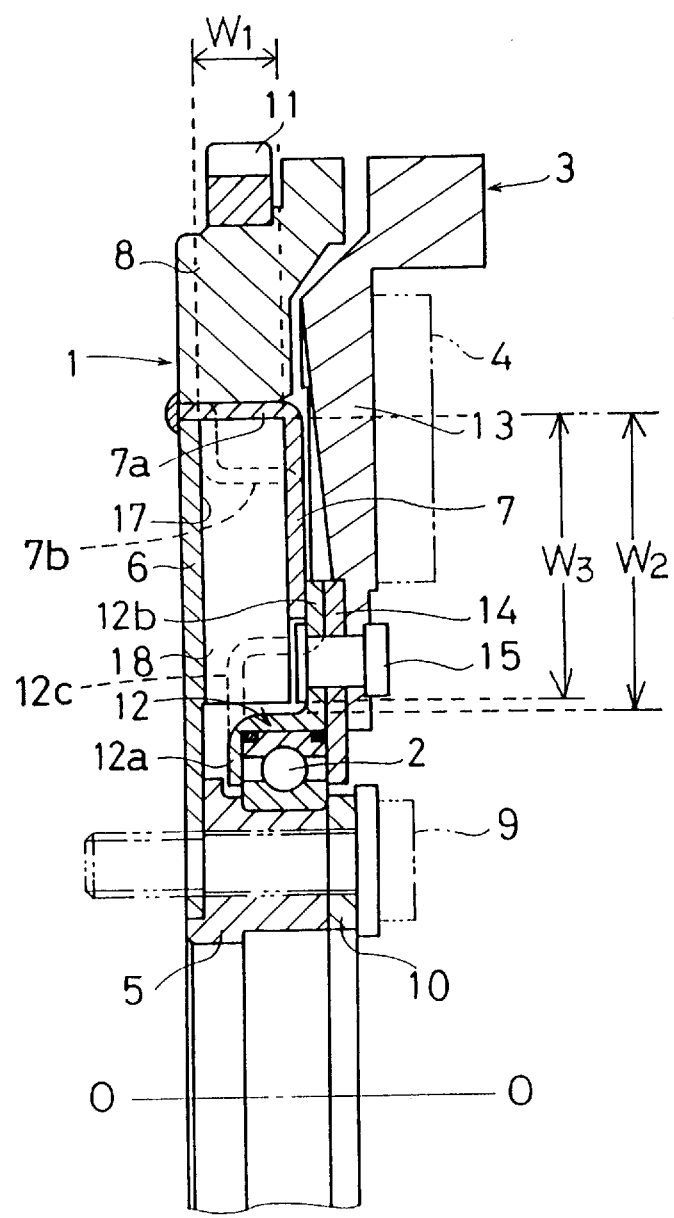
FIG. 1 is a fragmentary side sectional view of a flywheel assembly in accordance with a first embodiment of the present invention.
Figure 2:
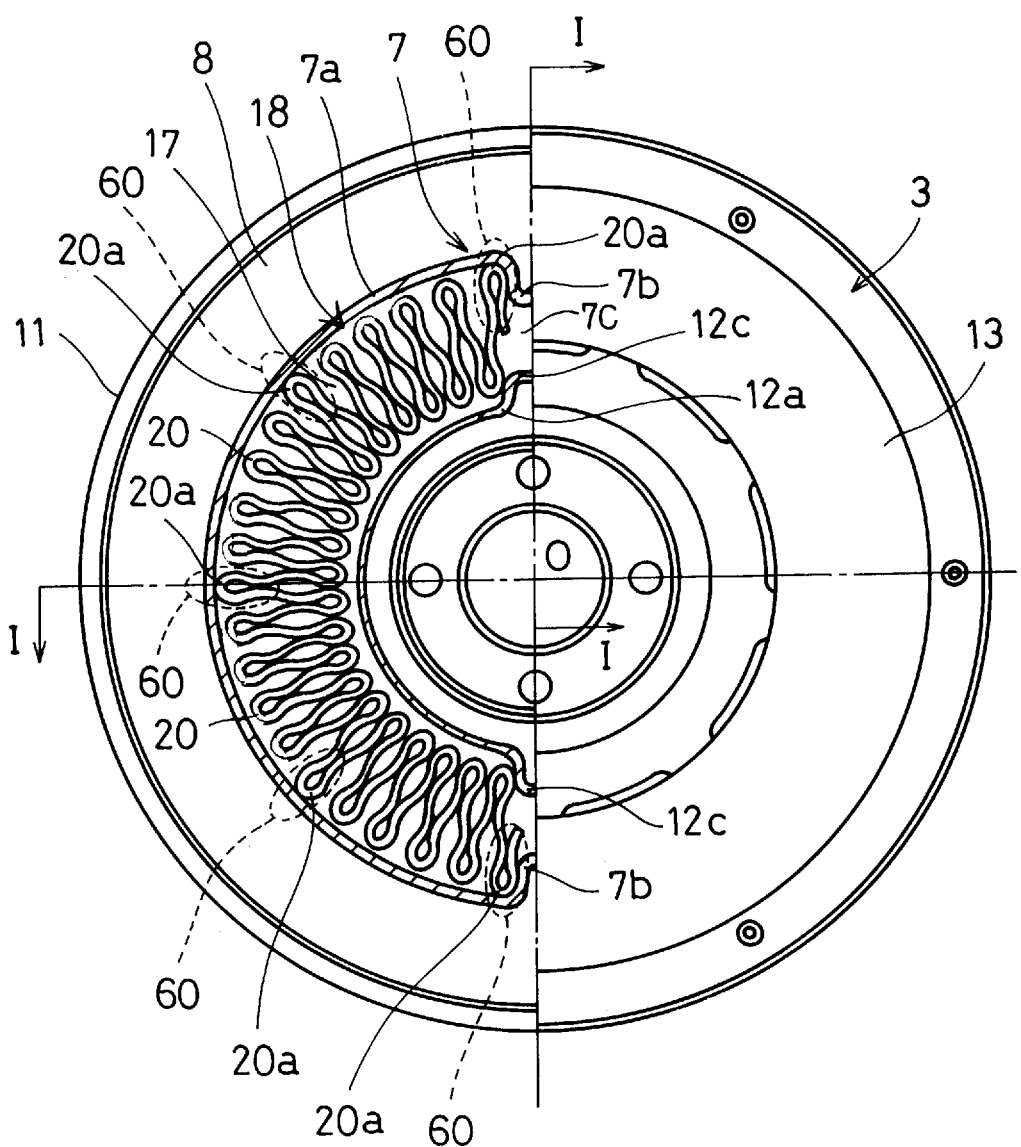
FIG. 2 is a part section, part elevational front view of the flywheel assembly depicted in FIG. 1 showing elements of the flywheel assembly including an undulated ribbon-like spring.

FIGS. 1 and 2 show an automotive flywheel assembly using a damper mechanism in accordance with one embodiment of the invention. In FIG. 1, the line O—O denotes a rotary axis of the flywheel assembly. An engine (not shown) would typically be positioned to the left side of FIG. 1 during normal operation of the present invention, and a transmission would be positioned to the right side of FIG. 1. Herein after, the left side of FIG. 1 will be referred to as the engine side and the right side of FIG. 1 will be referred to as the transmission side.

The flywheel assembly is mainly composed of a first flywheel 1 fixed to a crankshaft (not shown) on the engine side, a second flywheel 3 supported rotatably to the first flywheel 1 through a bearing 2, and a pair of undulated ribbon-like springs 18 for transmission of the torque between the flywheels 1 and 3.

The first flywheel 1 has a hub 5 centrally disposed therein, a disc-like input plate 6 disposed on the engine side of the hub 5, a disc-like facing plate 7 disposed to face the input plate 6, and an annular first flywheel body 8 fixed to outer circumferential portion of the input plate 6.

The hub 5 and the input plate 6 are fixed to the crankshaft (not shown) by a plurality of bolts 9 and a washer plate 10. The outer circumferential portion of the facing plate 7 is formed into an outer circumferential sleeve portion 7a extending toward the engine. The outer circumferential sleeve portion 7a is inserted into the inner circumferential portion of the first flywheel body 8 with its front edge being, for instance, welded to the outer circumferential portion of the input plate 6 and the inner circumferential portion of the first flywheel body 8. Also, a ring gear 11 is fixed to the outer circumferential portion of the first flywheel body 8.

Figure 3:
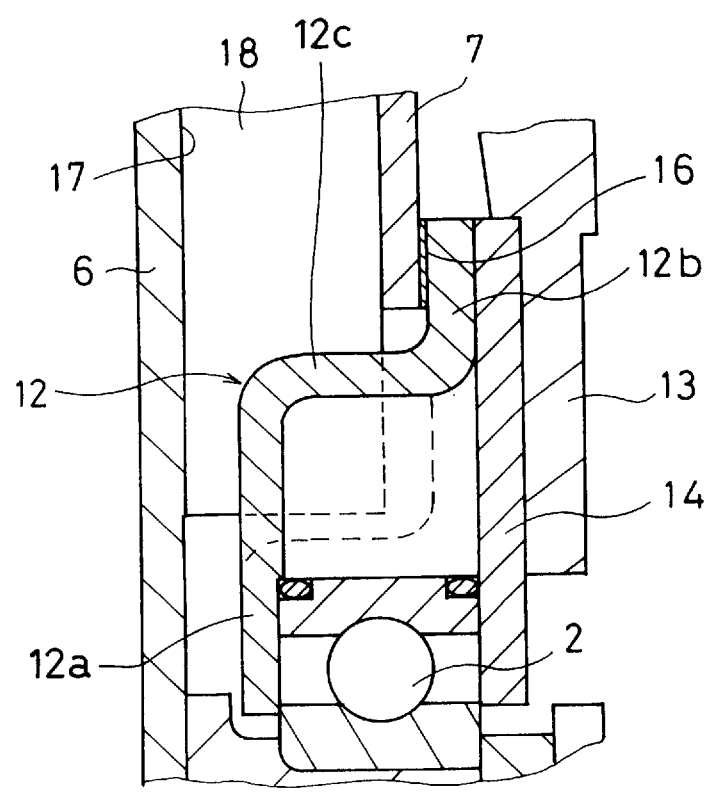
FIG. 3 is a fragmentary enlarged view of a portions of the flywheel assembly depicted in FIG. 1.

The second flywheel 3 is mainly composed of an output plate 12, an annular second flywheel body 13 and a disc-like intermediate plate 14 interposed between the output plate 12 and the second flywheel body 13. The second flywheel 13, the intermediate plate 14 and the output plate 12 are coupled with each other by a plurality of rivets 15. The output plate 12 is composed of an inner circumferential support portion 12a supported through the bearing 2 and a mount flange portion 12b extending radially outwardly from the support portion 12a. The above-described rivets 15 are fixed to the mount flange portion 12b. The support portion 12a is in contact with a surface on the engine side and an outer circumferential surface of the bearing 2. As shown in an enlarged manner in FIG. 3, a seal member 16 is provided between the outer circumferential portion of the mount flange portion 12b and the inner circumferential portion of the facing plate 7 for sealing both components. The inner circumferential portion of the intermediate plate 14 is in contact with a surface of the bearing 2 on the transmission side. A clutch disc 4 may be frictionally engaged with the second flywheel body 13.

An annular fluid chamber 17 is defined by the above-described input plate 6, facing plate 7 and output plate 12. A viscous fluid such as grease or the like is disposed inside of the annular fluid chamber 17. Also, as shown in FIGS. 1 and 2, retainer portions 7b are formed at two opposing positions and extend radially inward. Similarly, retainer portions 12c are formed on the outer circumferential portion of the support portion 12a of the output plate 12 at two opposing positions and extend radially outwardly adjacent to the retainer portions 7b. With such an arrangement, the annular fluid chamber 17 is divided into a pair of sub-chambers by the portions 7b and 12c. However, the viscous fluid may flow between the sub-chambers because a gap 7c is defined between the retainer portions 7b and the retainer portion 12c. One undulated ribbon-like spring 18 is disposed within each sub-chamber. It should be understood that only one sub-chamber is shown in FIG. 2

The undulated ribbon-like springs 18 will be described with reference to FIG. 4 in greater detail below.

Figure 4:
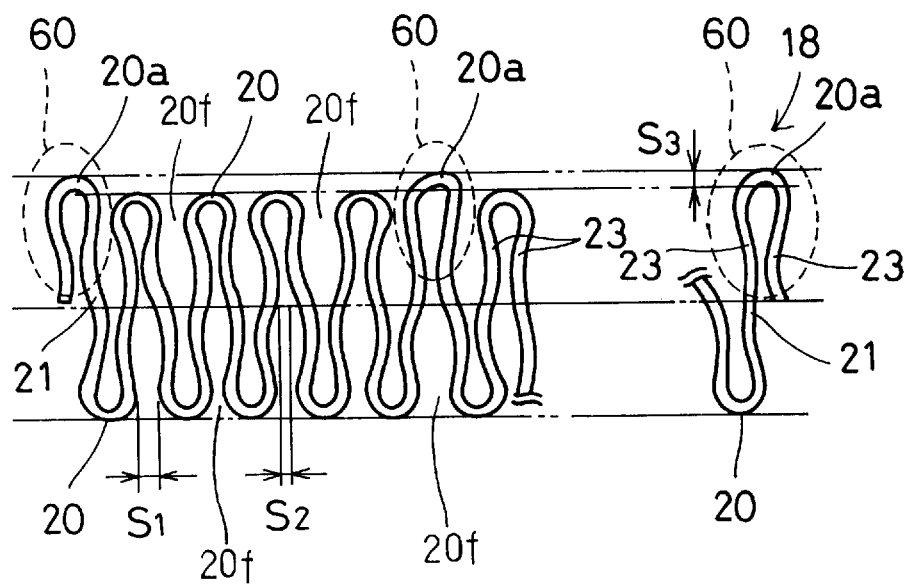
FIG. 4 is a fragmentary front view of the undulated ribbon-like spring employed in the flywheel assembly depicted in FIGS. 1 and 3 but shown removed from the flywheel assembly.

FIG. 4 shows the undulated ribbon-like spring 18 in an unstressed state, removed from the arcuate chambers. In its unstressed state, the undulated ribbon-like spring 18 has a generally linear shape shown in FIG. 4. It should therefore be understood, that when installed in the arcuate chambers in the flywheel assembly, the undulated ribbon-like spring 18 must be subjected to bending and compressive forces in order for it to conform to the arcuate shape shown in FIG. 2. As shown in FIG. 4 in an unstressed state, the undulated ribbon-like spring 18 has the appearance of a folded ribbon with a wavy or serpentine appearance with each fold or loop having a predetermined width. The spring 18 may be defined as a plurality of joined spring elements made of ring portions 20 and lever portions 21 that are unitarily formed or connected in series to comprise the elongated spring 18 shown in FIG. 4.

A plurality of ring portions 20 are each in the form of an annular member having substantially the same diameter. A gap $S_1$ having a predetermined width is defined between the adjacent ring portions 20 in the unstressed state. An inner side of each ring portion 20 is formed into an open ring portion 23. The open ring portion 23 has a gap $S_2$ in the unstressed state and in a set condition installed in the flywheel assembly. Lever portions 21 extend from both sides of the open ring portion 23, respectively. The lever portions 21 are shaped such that the distance between the lever portions 21 increases toward the opening 20f. Further, the ring portions 20 are continuous with the lever portions 21.

With reference again to FIG. 1, an axial width $W_1$ of the undulated ribbon-like springs 18 is generally equal to or slightly less than the corresponding axial width of the fluid chamber 17. Further, the axial width $W_1$ is generally half or less than half the radial width $W_2$ of the chamber 17. Also, the radial width $W_3$ of the spring 18 is slightly less than the radial width $W_2$ of the chamber 17.

Referring again to FIG. 4, one guide ribbon-like spring portions 60 is formed for every five ring portions 20 on the outer circumferential side of the undulated ribbon-like spring 18. The guide leaf plate portions 60 extend outwardly defining outer circumferential spring elements with projecting ring portions 20a. The projecting ring portions 20a extend radially outwardly by a space $S_3$ from the ring portions 20.

Also, the projecting ring portions 20a are formed at each end of the undulated ribbon-like spring 18 on the outer circumferential side, as shown in FIG. 2, and contact the retainer portions 7b, whereas the ring portions 20 on either end thereof on the inner circumferential side contact the retainer portions 12c.

The operation of the present invention in accordance with the first embodiment will now be explained.

A torque which has been input into the first flywheel 1 from the crankshaft on the engine side is transmitted to the undulated ribbon-like springs 18 through the input plate 6 and the retainer portions 7b of the facing plate 7 and is further transmitted from the undulated ribbon-like springs 18 to the second flywheel 3 through the retainer portions 12c of the output plate 12.

When the torsional vibration is input into the flywheel assembly, the undulated ribbon-like springs are repeatedly compressed, so that the viscous fluid passes between the undulated ribbon-like springs 18 and the fluid chamber 17. The viscous resistance generated at this time serves to attenuate the torsional vibration.

When the undulated ribbon-like springs 18 are compressed, the opening angle of each lever portion 21 is decreased so that a bending moment is applied to the associated ring portion 20. In this case, the lever portion 21 is elastically deformed about the open ring portion 23. Then, the bending moment is distributed uniformly in the longitudinal direction in the lever portion 21, and at the same time, an elastic energy is dispersedly accumulated in the plurality of ring portions 20.

In this case, the torsional characteristics are determined by the torsional rigidity of the undulated ribbon-like springs 18. Namely, in the small displacement angle range where the gap $S_2$ is provided in the open ring portion 23, the ring portions 20 and the lever portions 21 are elastically deformed in the same direction about the outer circumferential portions of the ring portions 20 of the undulated ribbon-like springs 18. At this time, the torsional rigidity is small. When the displacement angle is increased, the gap $S_2$ becomes zero and the elastic energy is accumulated in the ring portions 20 about the open ring portions 23. Accordingly, the torsional rigidity is increased.

When the undulated ribbon-like springs 18 are compressed, they are likely to expand radially outwardly. Also, the undulated ribbon-like spring 18 as a whole is likely to move radially outwardly by the centrifugal forces. However, in this case, since the projecting ring portions 20a are brought into contact with the outer circumferential sleeve portion 7a, the other ring portions 20 are kept spaced apart from the outer circumferential sleeve portion 7a, and therefore contact between the spring 18 and outer circumferential sleeve portion 7a is minimized thus reducing friction contact as the undulated ribbon-like spring 18 and the outer circumferential sleeve portion 7a move relative to one another. As a result, the frictional resistances generated therebetween are reduced. The fine vibration generated in the rotation of the engine in a practical range may be sufficiently attenuated with the low rigidity and low resistance.

Second Embodiment

Figure 5:
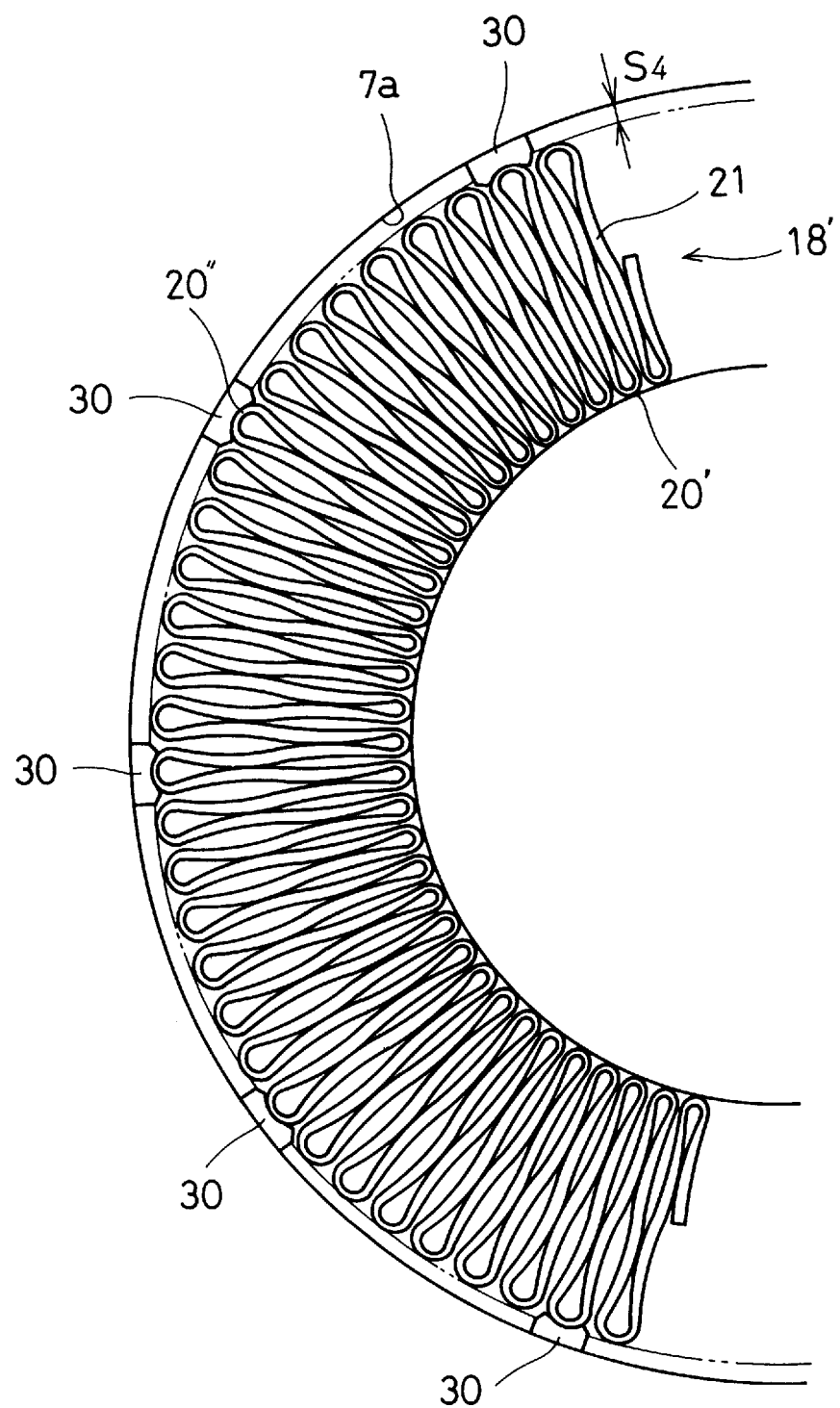
FIG. 5 is a fragmentary front view showing portions of a flywheel assembly employing an undulated ribbon-like spring in accordance with a second embodiment of the present invention.

The ribbon-like spring 18' shown in FIG. 5 is used in a damper mechanism in the same manner as the undulated ribbon-like spring 18 described in the first embodiment above. However, the number of the ring portions 20' and 20" of the undulated ribbon-like spring 18' is more than that of the undulated ribbon-like spring 18 in the foregoing embodiment. Further, all of the ring portions 20' and 20" define generally constant radii in the spring 18' such that there are generally no additional protruding ring portions, as in the first embodiment. Also, in the undulated ribbon-like spring 18' as shown in FIG. 4, each of the ring portions 20" on the outer circumferential edge have an arc diameter greater than that of the ring portions 20' on the inner circumferential side. Furthermore, a plate thickness of the ring portions 20" and 20' is thinner than that of the lever portions 21. One slider 30 is provided on the outer circumferential side for every seven ring portions 20" on the outer circumferential side. Each slider 30 is so constructed as to receive a tip end of one of the ring portions 20" on its inner circumferential side. The outer circumferential side of the slider 30 is so constructed that it is slidable in the circumferential direction on the outer circumferential sleeve portion 7a of the arcuate chamber. Thus, since the sliders 30 are disposed between the undulated ribbon-like spring 18 and the outer circumferential sleeve portion 7a, a gap $S_4$ is kept between the outer circumferential sleeve portion 7a and the ring portions 20 on the outer circumferential side of the undulated ribbon-like spring 18. As a result, when the undulated ribbon-like spring 18 is compressed, the ring portions 20" on the outer circumferential side are prevented from engaging the outer circumferential sleeve portion 7a. A Teflon coating is applied to the outer circumferential sleeve portion 7a. The slider 30 is made of material that has a low frictional coefficient to the outer circumferential sleeve portion 7a. As a result, a frictional resistance generated between the outer circumferential sleeve portion 7a and the slider 30 is small.

Third Embodiment

Figure 6:
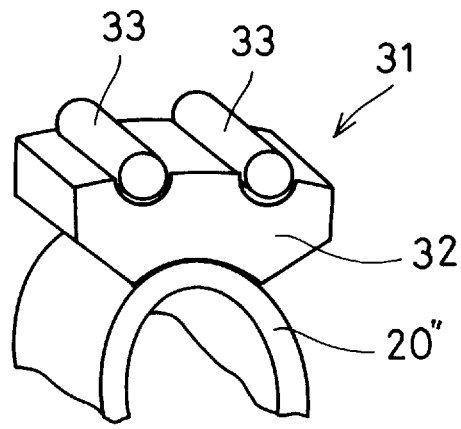
FIG. 6 is a fragmentary perspective view showing an undulated ribbon-like spring in accordance with a third embodiment of the present invention.
Figure 7:
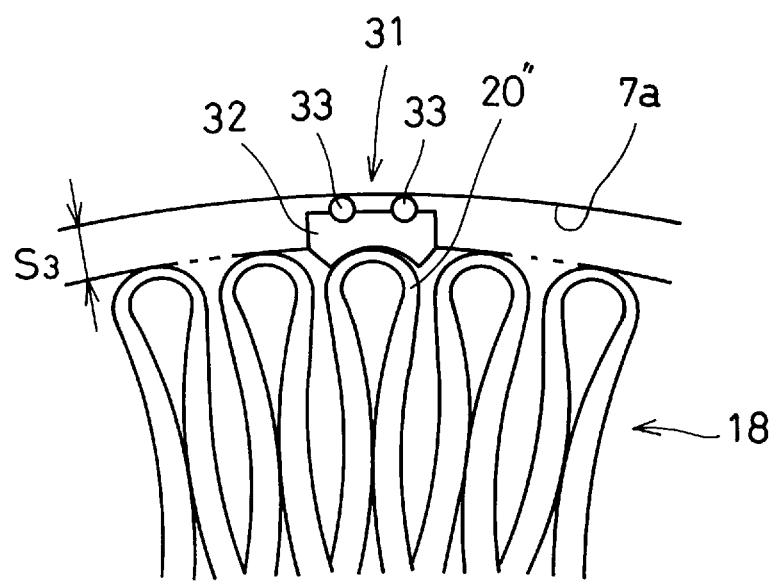
FIG. 7 is a fragmentary front elevational view showing the undulated ribbon-like spring in accordance with a third embodiment of the present invention.

In a undulated ribbon-like spring shown in FIGS. 6 and 7, rollers 33 are provided outside of the slider 31. The slider 31 is similar to the slider 30 that has been explained above with regard to the second embodiment. The slider 31 is composed of a body 32, two rollers 33 provided on the outer circumferential side of the body 32 extending in the axial direction. Each roller 33 is supported rotatably to the body 32. The rollers 33 are brought into contact with the outer circumferential sleeve portion 7a so that the frictional resistance generated between the slider 31 and the outer circumferential sleeve portion 7a is smaller. Alternatively, it is also possible to use ball bearings or spherical members instead of the rollers 33.

Fourth Embodiment

Figure 8:
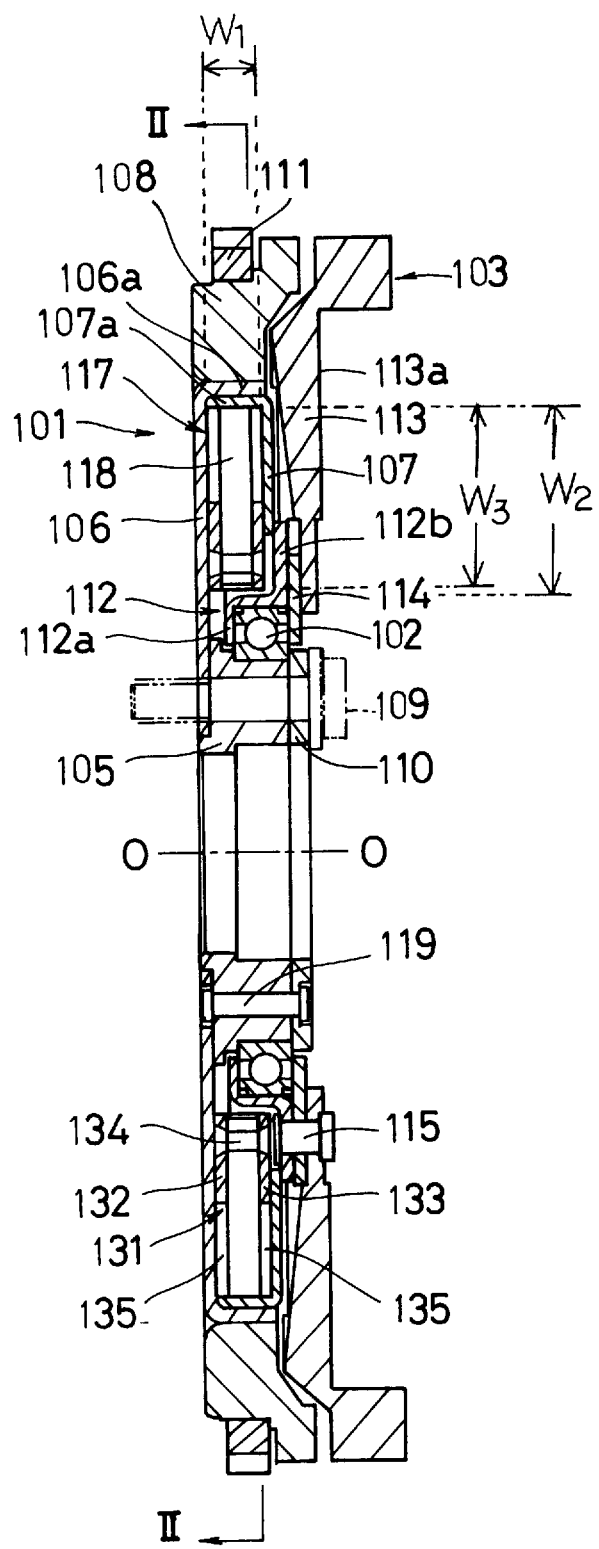
FIG. 8 is a side sectional view of a flywheel assembly in accordance with a fourth embodiment of the present invention.
Figure 9:
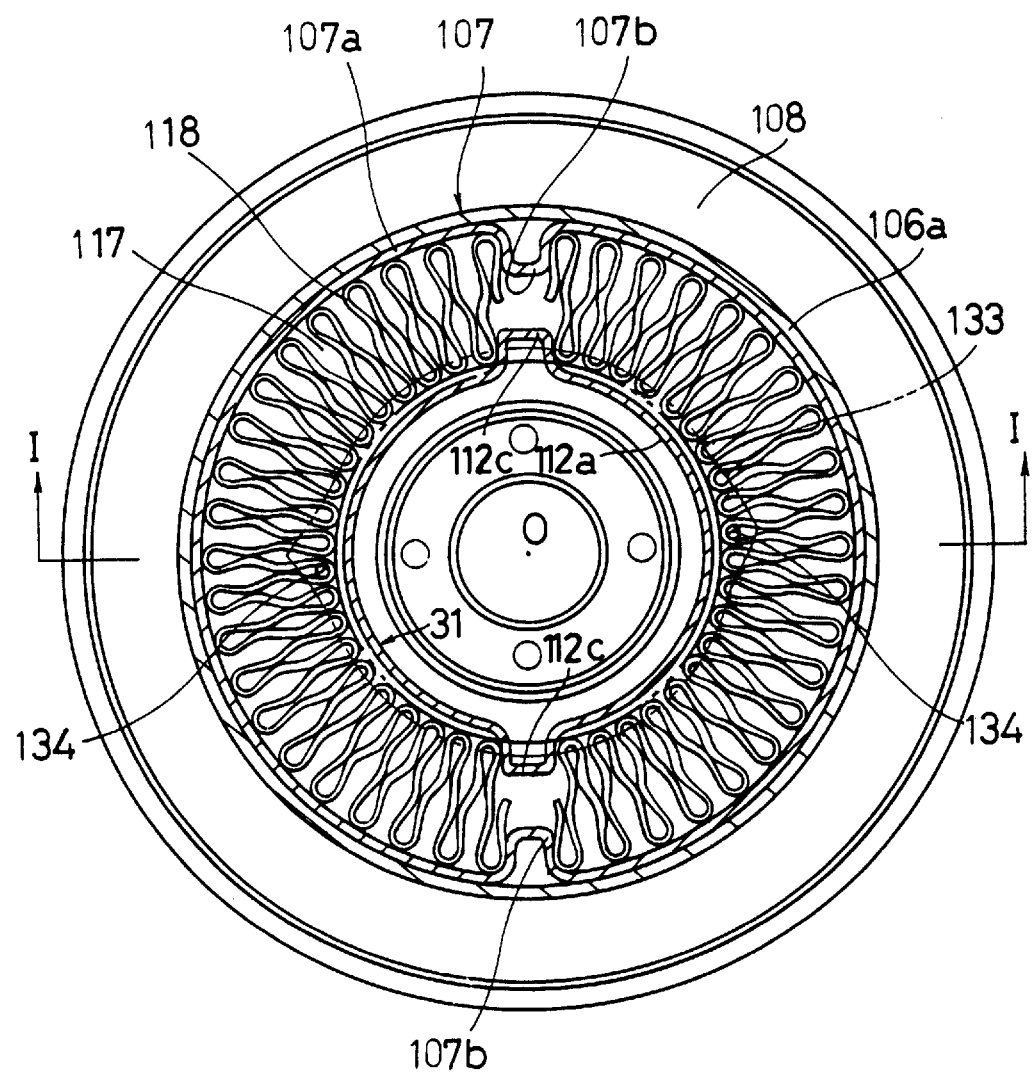
FIG. 9 is a cross-sectional view taken along the line II—II of FIG. 8 showing an undulated ribbon-like spring in accordance with the fourth embodiment of the present invention.

FIGS. 8 and 9 show an automotive flywheel assembly using a damper mechanism in accordance with a fourth embodiment of the invention. In FIG. 8, the line O—O denotes a rotary axis of the flywheel assembly.

The flywheel assembly is mainly composed of a first flywheel 101 fixed to a crankshaft (not shown) on the engine side, a second flywheel 103 supported rotatably to the first flywheel 101 through a bearing 102, and a pair of undulated ribbon-like springs 118 for transmission of the torque between the flywheels 101 and 103.

The first flywheel 101 has a hub 105 disposed in a central portion, a disc-like input plate 106 disposed on the engine side of the hub 105, a disc-like facing plate 107 disposed to face the input plate 106, and an annular first flywheel body 108 fixed to outer circumferential portion of the input plate 106. The hub 105 and the input plate 106 are fixed to the crankshaft (not shown) by a bolt 109 and a washer plate 110. Furthermore, the hub 105, the input plate 106 and the washer plate 110 are fixed to each other by rivets 119. An outer circumferential portion of the input plate 106 is formed into an outer circumferential sleeve portion 106a extending on the transmission side. The outer circumferential sleeve portion 106a is welded to an inner circumferential side of a first flywheel body 108. The outer circumferential portion of the facing plate 107 is formed into an outer circumferential sleeve portion 107a extending toward the engine. The outer circumferential sleeve portion 107a is welded to the inner circumferential portion of the outer circumferential sleeve portion 106a. Also, a ring gear 111 is fixed to the outer circumferential portion of the first flywheel body 108.

The second flywheel 103 is mainly composed of an output plate 112, an annular second flywheel body 113 and a disc-like intermediate plate 114 interposed between the output plate 112 and the second flywheel body 113. These components are coupled with each other by a plurality of rivets 115. The output plate 112 is composed of an inner circumferential support portion 112a supported through the bearing 102 and a mount flange portion 112b extending radially outwardly from the support portion 112a. The above-described rivets 115 are fixed to the mount flange portion 112b. The support portion 112a is in contact with a surface on the engine side and an outer circumferential surface of the bearing 102. A seal member (not shown) is provided between the outer circumferential portion of the mount flange portion 112b and the inner circumferential portion of the facing plate 107 for sealing both components. The inner circumferential portion of the intermediate plate 114 is in contact with a surface of the bearing 102 on the transmission side. A frictional surface 113a with which the clutch disc (not shown) may be frictionally engaged is formed on the second flywheel body 113.

An annular fluid chamber 117 is formed by the above-described input plate 106, facing plate 107 and output plate 112. A viscous fluid such as grease or the like is filled in an interior of the fluid chamber 117. Also, as shown in FIG. 9, retainer portions 107b that extend on the inner circumferential side are formed at two positions confronting each other in the radial direction. Furthermore, retainer portions 112c that extend radially outwardly are formed at two positions confronting the retainer portions 107b in the radial direction on the circumferential portion of the support portion 112a of the output plate 112. With such an arrangement, the annular fluid chamber 117 is divided into a pair of arcuate chambers. One undulated ribbon-like spring 118 is disposed in each of the arcuate chambers, respectively.

The undulated ribbon-like springs 118 will be explained with reference to FIG. 10 in more detail.

Figure 10:
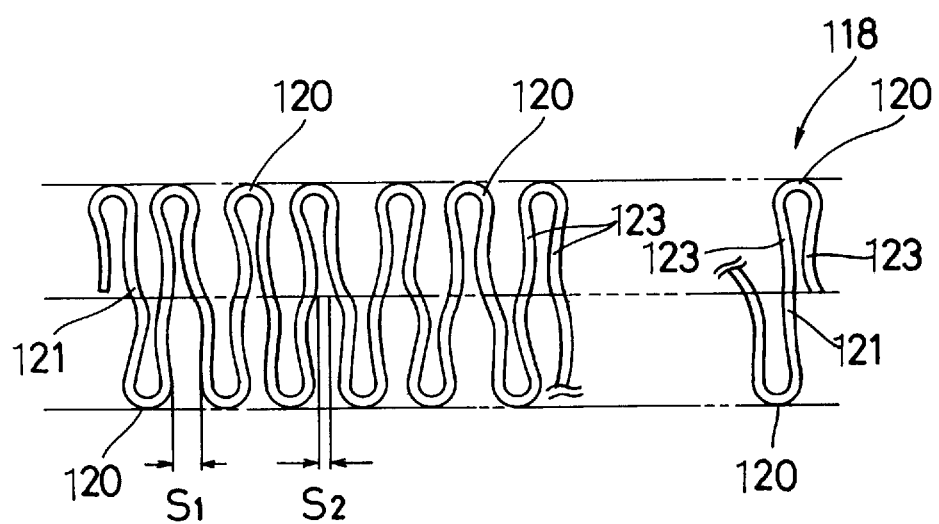
FIG. 10 is a partial frontal view showing the undulated ribbon-like spring depicted in FIG. 9, but shown here removed from the flywheel assembly.

As shown in FIG. 10 in an unstressed state, the undulated ribbon-like spring 118 is folded in a wavy or serpentine manner with a predetermined width. More specifically, a plurality of spring elements made of ring portions 120 and lever portions 121 are formed in series.

The plurality of ring portions 120 define an annular or arcuate member having substantially constant inner and outer diameter. As shown in FIG. 10, a gap $S_1$ having a predetermined width is formed between the adjacent ring portions 120 in a stress free state. An inner side of each ring portion 120 is formed into an open ring portion 123. The open ring portion 123 has a gap $S_2$ in the stress free state and also generally in the installed position in the damper mechanism. Lever portions 121 extend from each side of each open ring portion 123. The lever portions 121 extend so that an interval between the lever portions 121 is increased toward the outside and are continuous with one of the lever portions 121 of the facing ring portions 120.

As is shown in FIG. 8, an axial width $W_1$ of the undulated ribbon-like springs 118 is generally equal to or slightly less than the corresponding axial width of the fluid chamber 117. Further, the axial width $W_1$ is generally half or less than half the radial width $W_2$ of the chamber 117. Also, the radial width $W_3$ of the spring 18 is slightly less than the radial width $W_2$ of the chamber 117.

As is shown in FIG. 9, the ring portions 120 at each end of the outer circumferential portions of the undulated ribbon-like springs 118 are in contact with the retainer portions 107b and the ring portions 120 at the inner circumferential ends of the undulated ribbon-like springs 118 are in contact with the retainer portions 112c.

A coupling member 131 is disposed in the fluid chamber 117 and is formed with a pair of annular plates 132 and 133, and a pair of rivet pins 134 for coupling the annular plates 132 and 133. As is apparent from FIG. 8, the annular plates 132 and 133 extend on both sides of the pair of arcuate chambers 117 and are disposed rotatably on both sides in the axial direction of the inner circumferential portion of the undulated ribbon-like springs 118. An inner diameter of the annular plates 132 and 133 is somewhat greater than a diameter of the support portion 112a of the output plate 112. The pair of rivet pins 134 pass in the axial direction through the inner circumferential ring portions 120 in the vicinity of the center of each undulated ribbon-like spring 118 in the longitudinal direction and are fixed at both ends to the annular plates 132 and 133.

A pair of large spaces 135 are defined in the axial direction between the undulated ribbon-like spring 118 and the facing plate 107 and in the axial direction between the undulated ribbon-like spring 118 and the input plate 106 on the outer circumferential side of the fluid chamber 117.

The operation will now be explained.

A torque which has been input into the first flywheel 101 from the crankshaft on the engine side is transmitted to the undulated ribbon-like springs 118 through the input plate 106 and the retainer portions 107b of the facing plate 107 and is further transmitted from the undulated ribbon-like springs 118 to the second flywheel 103 through the retainer portions 112c of the output plate 112.

When the torsional vibration is input into the flywheel assembly, the first flywheel and the second flywheel are rotated relative to each other so that the undulated ribbon-like springs are repeatedly compressed in the circumferential direction. In the first embodiment, since the spaces 135 are formed between the undulated ribbon-like springs 118 and the axial side walls of the fluid chamber 117, a large viscous resistance will not be generated. When the undulated ribbon-like springs 118 are compressed, the opening angle of each lever portion 121 is decreased so that a bending moment is applied to the associated ring portion 120. In this case, the lever portion 121 is elastically deformed about the open ring portion 123. Then, the bending moment is distributed uniformly in the longitudinal direction in the lever portion 121, and at the same time, an elastic energy is dispersedly accumulated in the plurality of ring portions 120.

In this case, the torsional characteristics are determined by the torsional rigidity of the undulated ribbon-like springs 118. Namely, in the small displacement angle range where the gap $S_2$ is provided in the open ring portion 123, the ring portions 120 and the lever portions 121 are elastically deformed in the same direction about the outer circumferential portions of the ring portions 120 of the undulated ribbon-like springs 118. At this time, the torsional rigidity is small. When the displacement angle is increased, the gap $S_2$ becomes zero and the elastic energy is accumulated in the ring portions 120 about the open ring portions 123. Accordingly, the torsional rigidity is increased.

When the undulated ribbon-like springs 118 are compressed, they are likely to expand radially outwardly with each components. Also, the undulated ribbon-like springs 118 as a whole are likely to move radially outwardly by the centrifugal forces. However, in this case, since radially outward forces applied to the respective paired ribbon-like springs 118 are balanced by the coupling member 131, the paired undulated ribbon-like springs 118 are hardly shifted radially outwardly. As a result, the frictional resistances generated between the undulated ribbon-like springs 118 and the outer circumferential sleeve portion 107a would be reduced. As a result, in particular, the fine vibration generated upon the rotation of the engine in a practical range may be sufficiently attenuated with the low rigidity and low resistance.

The rivet pins 134 are inserted into the inner circumferential ring portions 120 in the vicinity of the center in the longitudinal direction of each undulated ribbon-like spring 118. Accordingly, the displacement angle of each undulated ribbon-like spring is kept at a maximum level.

Fifth Embodiment

Figure 11:
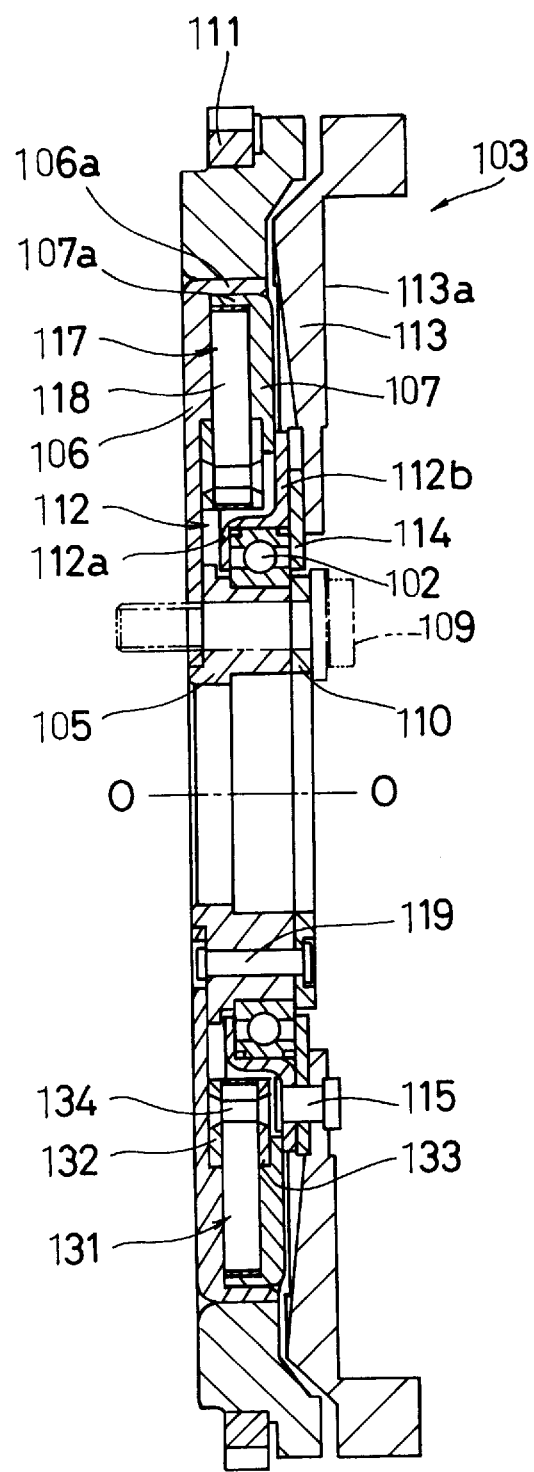
FIG. 11 is a side sectional view of a flywheel assembly in accordance with a fifth embodiment of the present invention.

In a flywheel assembly shown in FIG. 11, a width of a undulated ribbon-like spring 118 is substantially the same as a width of an interior of the fluid chamber 117. More specifically, a thickness on the outer circumferential side of each of the input plate 106 and the facing plate 107 is increased to eliminate the gap between the undulated ribbon-like springs 118 and the plates 106 and 107 (i.e. to eliminate the space 35 in the fourth embodiment). As a result, upon the expansion/compression of the undulated ribbon-like springs 118, the viscous fluid will flow between the undulated ribbon-like springs 118 and the fluid chamber 117 to generate the viscous resistance.

Sixth Embodiment

Figure 12:
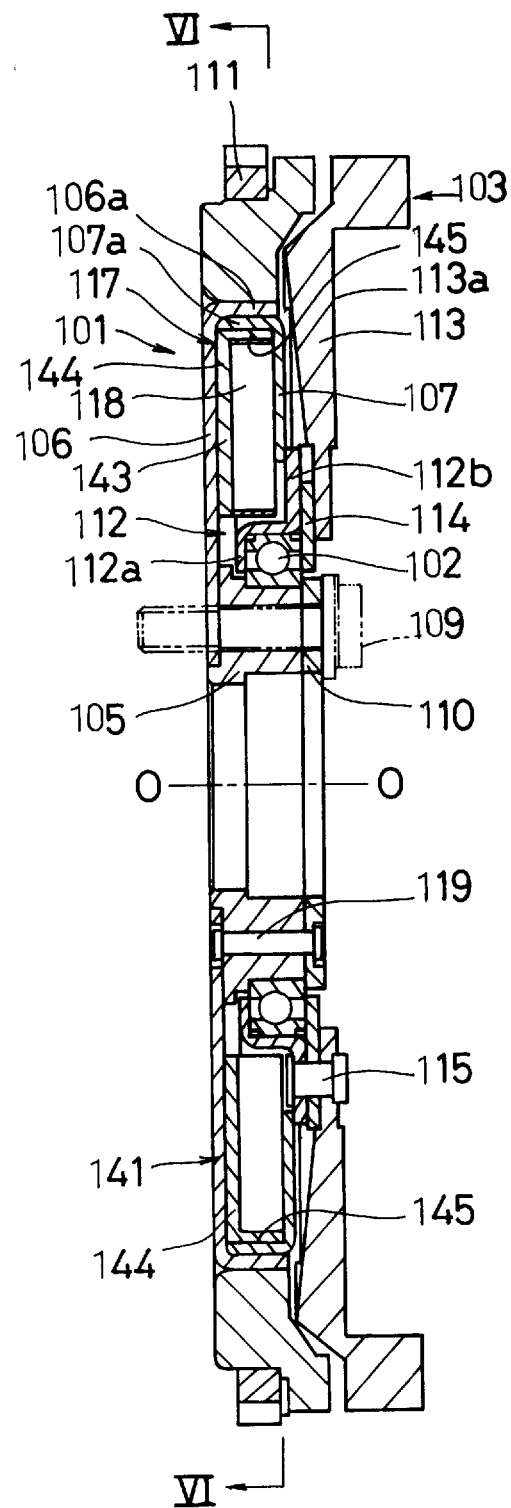
FIG. 12 is a side sectional view showing a flywheel assembly in accordance with a sixth embodiment of the present invention.
Figure 13:
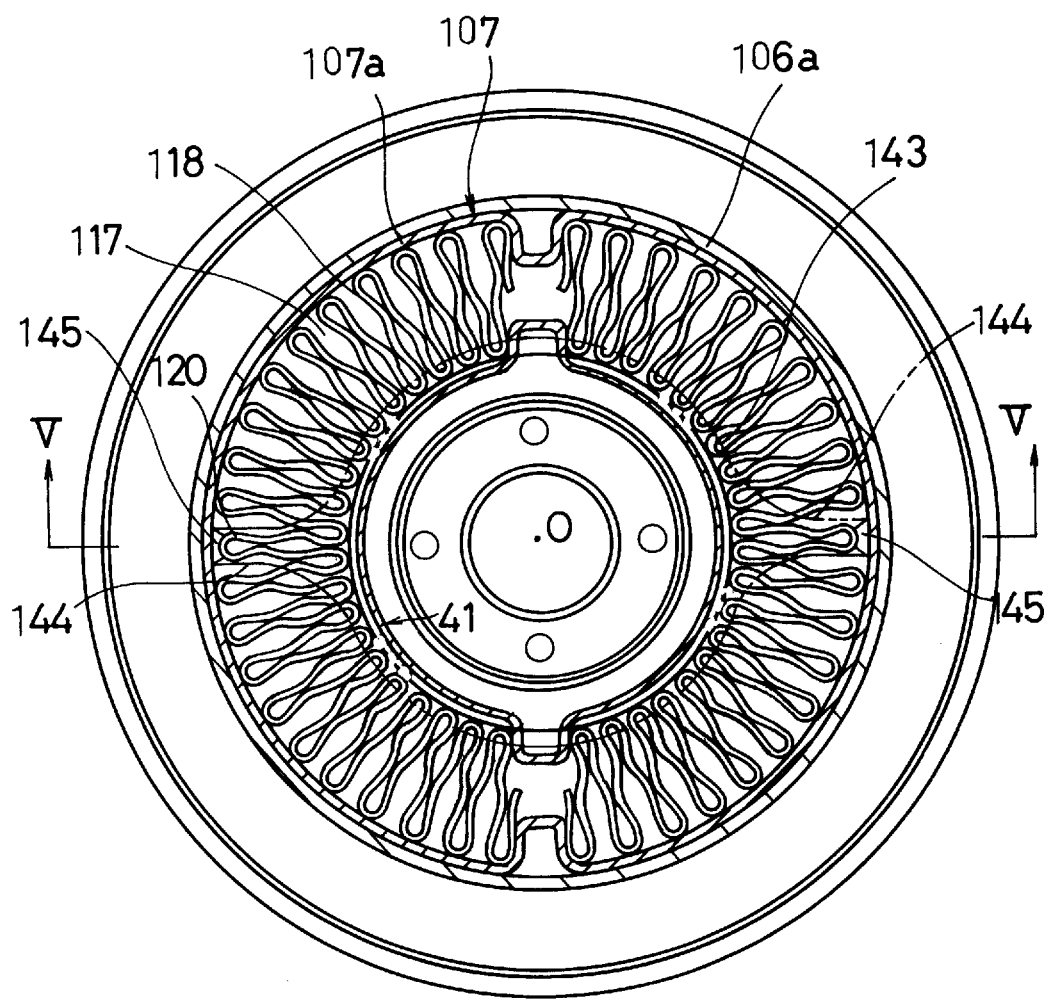
FIG. 13 is a cross-sectional view taken along the line VI—VI of FIG. 12.

In a flywheel assembly shown in FIGS. 12 and 13, the coupling member 141 is disposed in the fluid chamber 117. The coupling member 141 is composed of an annular plate 143 expanding over all the fluid chamber 117, extension portions 144 extending radially outwardly from two positions confronting in the radial direction in the annular plate 143, and contact portions 145 extending from the extension portions 144 on the transmission side. As is apparent from FIG. 12, the annular plate 143 is disposed on the engine side of the undulated ribbon-like springs 118 in the fluid chamber 117. The inner circumferential surface of each contact portion 145 is engaged with the outer circumferential side of the outer circumferential ring portions 120 in the vicinity of the center in the longitudinal direction of each undulated ribbon-like spring 118 for the one-piece rotation. Also, the outer circumferential surface of the contact portion 145 is formed into a shape so as to be slidable along the outer circumferential sleeve portion 107a.

In this embodiment, when the undulated ribbon-like springs 118 are compressed, the undulated ribbon-like spring 118 are likely to expand radially outwardly and also, the undulated ribbon-like springs 118 are subjected to the centrifugal forces. However, in this case, since radially outward forces applied to the respective paired ribbon-like springs 118 are balanced by the contact portions 145, each undulated ribbon-like spring 118 is hardly shifted radially outwardly. As a result, the frictional resistances generated between the undulated ribbon-like springs 118 and the outer circumferential sleeve portion 107a would be reduced. Furthermore, since the contact portions 145 are engaged with the outer circumferential ring portions 120 in the vicinity of the center in the longitudinal direction of the undulated ribbon-like springs 118, it is possible to maintain a maximum displacement angle of the undulated ribbon-like springs 118.

In the foregoing embodiments, the pair of undulated ribbon-like springs are applied to the damper mechanism according to the present invention. However, it is possible to apply three or more undulated ribbon-like springs to three or more arcuate chambers of the damper mechanism.

Seventh Embodiment

Figure 14:
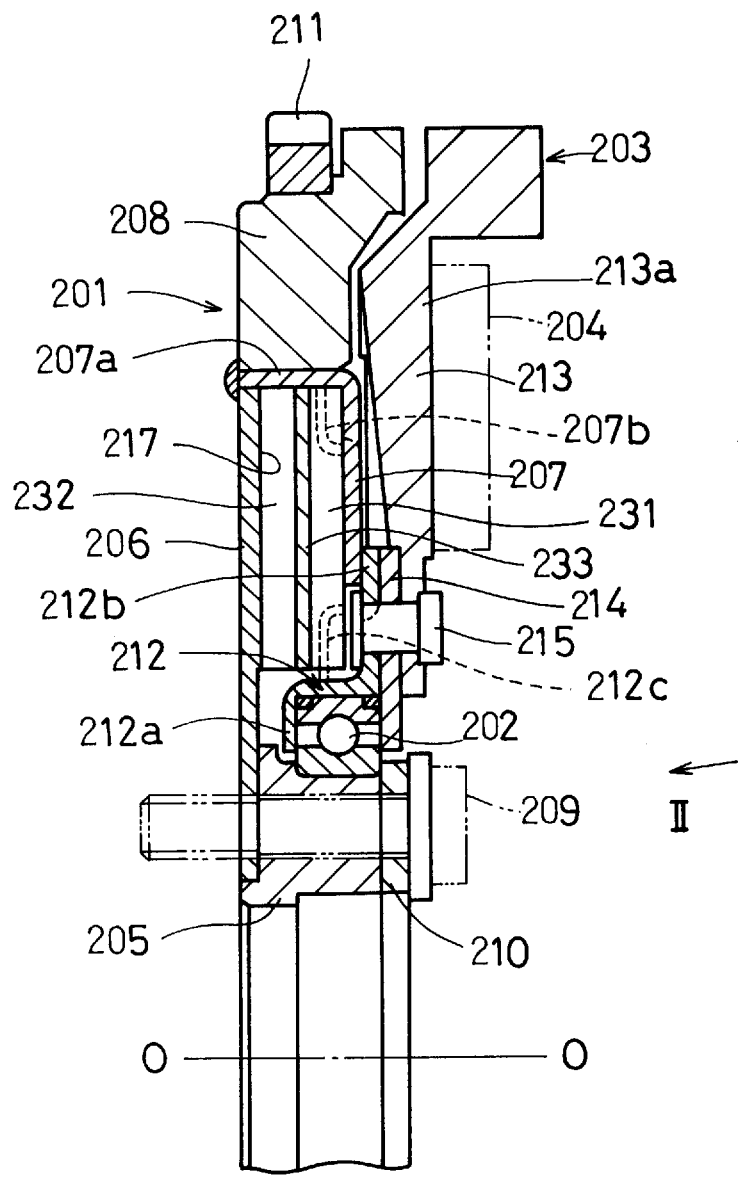
FIG. 14 is a side sectional view of a flywheel assembly in accordance with a seventh embodiment of the present invention.
Figure 15:
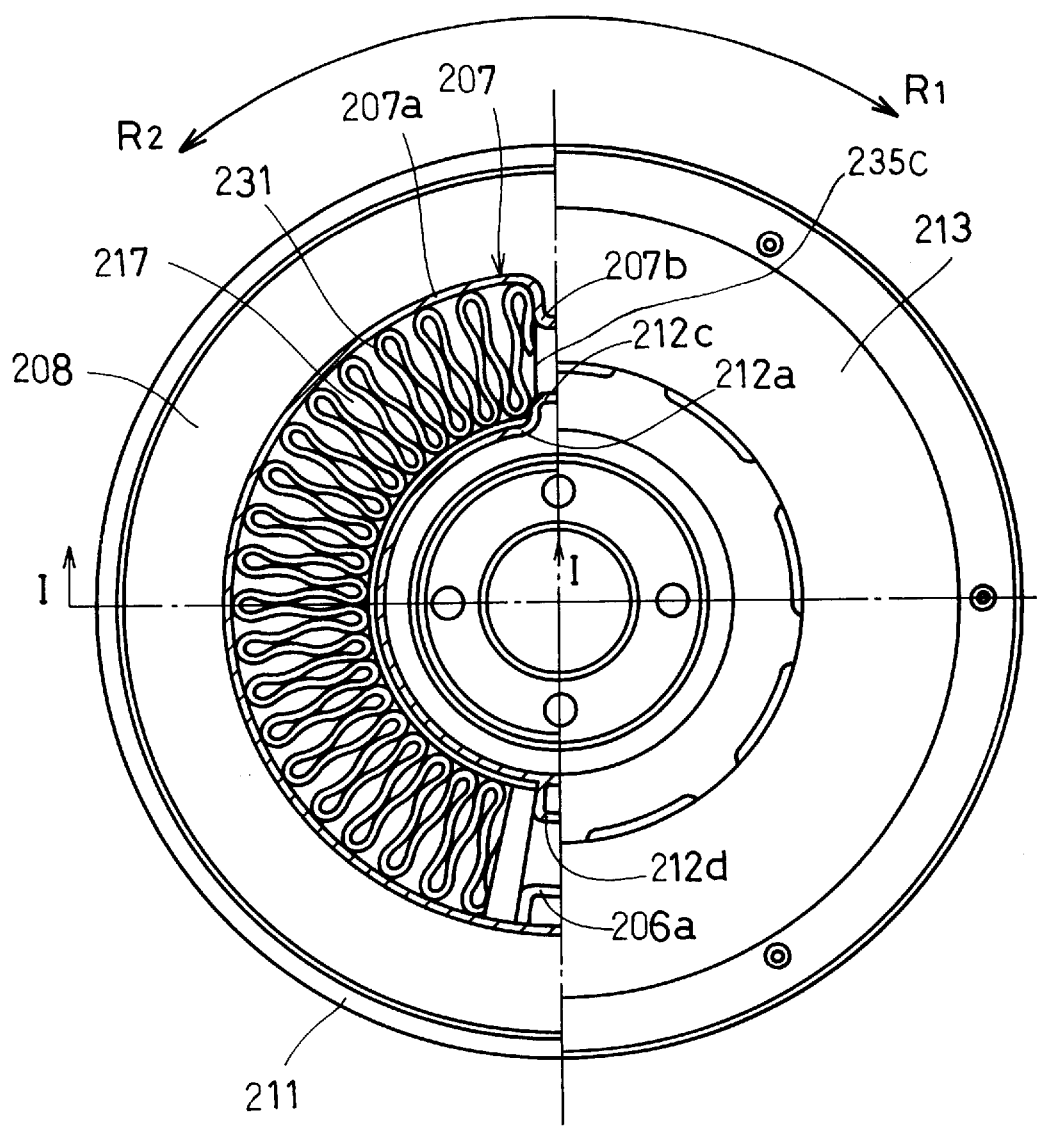
FIG. 15 is a part section, part elevational front view of the flywheel assembly depicted in FIG. 14 showing elements of the flywheel assembly including an undulated ribbon-like spring looking in the direction indicated by the arrow II in FIG. 14.

FIGS. 14 and 15 show an automotive flywheel assembly using a damper mechanism in accordance with a seventh embodiment of the invention. In FIG. 14, the line O—O denotes a rotary axis of the flywheel assembly. In FIG. 15, the direction $R_1$ denotes a rotational direction of the flywheel assembly. Although not shown in the drawings, an engine is disposed on the left side of FIG. 14 and a clutch disc and a transmission are disposed on the right side of FIG. 14.

The flywheel assembly is mainly composed of a first flywheel 201 fixed to a crankshaft (not shown) on the engine side, a second flywheel 203 supported rotatably to the first flywheel 201 through a bearing 202, and a first and second undulated ribbon-like springs 231 and 232 for transmission of the torque between both the flywheels.

The first flywheel 201 has a hub 205 disposed in a central portion, a disc-like input plate 206 disposed on the engine side of the hub 205, a disc-like facing plate 207 disposed to face the input plate 206, and an annular first flywheel body 208 fixed to outer circumferential portions of the plates 206 and 207. The inner circumferential portions of the hub 205 and the input plate 206 are fixed to the crankshaft (not shown) by a plurality of bolts 209 and a washer plate 210. The outer circumferential portion of the facing plate 207 is formed into an outer circumferential sleeve portion 207a extending toward the engine. The outer circumferential sleeve portion 207a is inserted into the inner circumferential portion of the first flywheel body 208 with its front edge being welded to the outer circumferential portion of the input plate 206 and the inner circumferential portion of the first flywheel body 208. Also, a ring gear 211 is fixed to the outer circumferential portion of the first flywheel body 208.

The second flywheel 203 formed with an annular second flywheel body 213. The annular second flywheel body 213 is connected to an output plate 212, and a disc-like intermediate plate 214 interposed between the output plate 212 and the second flywheel body 213. These components are coupled with each other by a plurality of rivets 215. The output plate 212 is formed with an inner circumferential support portion 212a supported on the bearing 202 and a mount flange portion 212b extending radially outwardly from the support portion 212a. The support portion 212a is in contact with surface both an outer radial surface of the bearing 202 and an axial surface of the bearing 202 on the engine side. A seal member (not shown) is provided between the outer circumferential portion of the mount flange portion 212b and the inner circumferential portion of the facing plate 207 for sealing both components. The inner circumferential portion of the intermediate plate 214 is in contact with another axial surface of the bearing 202 on the transmission side. A frictional surface 213a with which frictional facings 204 engage is formed on one side of the flywheel body 213.

An annular fluid chamber 217 is formed by the above-described input plate 206, facing plate 207 and output plate 212. A viscous fluid such as grease or the like is disposed in the fluid chamber 217. As is shown in FIG. 15., a retainer portion 212c that extends radially outwardly is formed on the circumferential portion of the support portion 212a of the output plate 212. Furthermore, a retainer portion 212d that extends radially outwardly is formed at a position opposite the retainer portion 212c. The retainer portion 212d is disposed on the engine side of the chamber 217. A retainer portion 207b that extends radially inwardly is formed at a position of the outer circumferential sleeve portion 207a corresponding to the retainer portion 212c. A retainer portion 206a that extends toward the fluid chamber 217 is formed on the outer circumferential portion of the input plate 206 at a position facing the retainer portion 212d in the radial direction. The retainer portion 207b is disposed on the transmission side of the fluid chamber 217. The retainer portion 206a is disposed on the engine side of the fluid chamber 217. With such an arrangement, the annular fluid chamber 217 is divided into two arcuate chambers 217, although only one chamber 217 is depicted in FIG. 14. Incidentally, the viscous fluid may move back and forth between the pairs of arcuate chambers. A first undulated ribbon-like spring 231 and a second undulated ribbon-like spring 232 are disposed within each pair of arcuate chambers, respectively.

One of the arcuate chambers will now be described.

Figure 16:
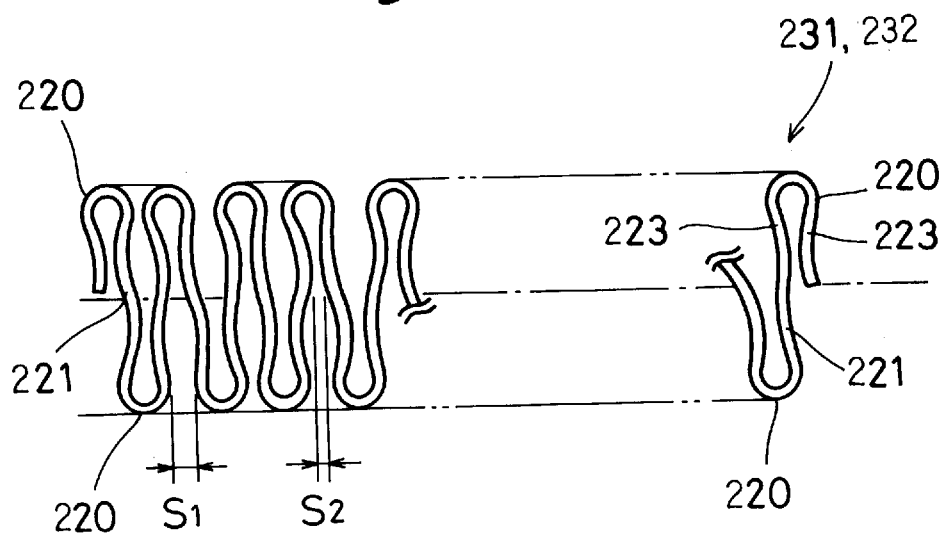
FIG. 16 is a fragmentary front view showing the undulated ribbon-like spring removed from the flywheel assembly depicted in FIGS. 14 and 15.

As shown in FIG. 16, the first and second undulated ribbon-like springs 231 and 232 are formed by bending plate members having a constant width into a corrugated or serpentine manner. In more detail, as shown in FIG. 16, each of the springs 231 and 232 include a plurality of spring elements made of ring portions 220 and lever portions 221 are formed or connected in series.

A plurality of ring portions 220 are each in the form of an arcuate member, each ring portion 220 having substantially the same arcuate diameter. A gap $S_1$ having a predetermined length is defined between the adjacent ring portions 220 in an unstressed state. An inner side of each ring portion 220 is formed into an open ring portion 223. The open ring portion 223 has a gap $S_2$ in the unstressed state and in a set condition in the fluid chamber 217. Lever portions 221 and 223 extend between adjacent ring portion 220 of the springs 231 and 232, as shown in FIG. 16. The lever portions 221 extend so that an interval between the lever portions 221 is increased toward the outside and are continuous with one of the lever portions 221 of the facing ring portions 220.

Figure 17:
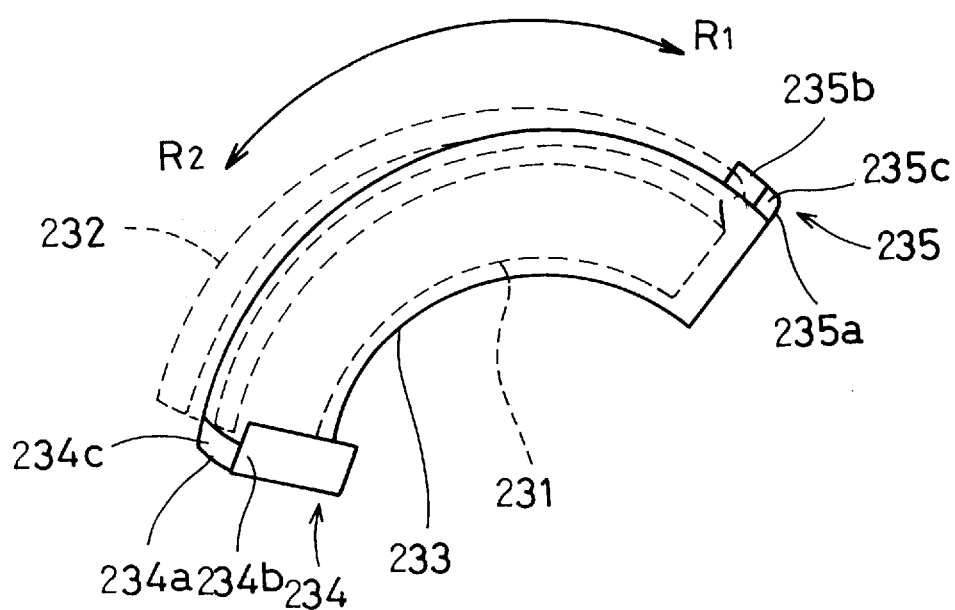
FIG. 17 is a perspective view showing the arrangement of the undulated ribbon-like springs and a coupling member shown removed from the flywheel assembly depicted in FIGS. 14 and 15.

A axial width of the first and second undulated ribbon-like springs 231 and 232 combined is equal to or less than half the radial width of the fluid chamber 217. The radial width of each of the springs 231 and 232 is less than that of the fluid chamber 217 in a manner similar to the previously described embodiments above. The first undulated ribbon-like spring 231 and the second undulated ribbon-like spring 232 are arranged axially side by side. A coupling member 233 is disposed between the first undulated ribbon-like spring 231 and the second undulated ribbon-like spring 232. A body portion of the coupling member 233 extends in the circumferential direction for preventing the first undulated ribbon-like spring 231 and the second undulated ribbon-like spring 232 from coming into contact with each other. As best shown in FIG. 17 removed from the chamber 217, the coupling member 233 is formed with a first contact portion 234 on an $R_2$ side of the coupling member 233. The first contact portion 234 has a retainer portion 234a extending from the body portion on the transmission side, a bent portion 234b bent on an $R_1$ side from the end of the retainer portion 234a, and support portions 234c formed on both sides of the retainer portion 234a in the radial direction. The end portion of the first undulated ribbon-like spring 231 on the $R_2$ side is retained at the first contact portion 234. More specifically, the $R_2$ side end portion of the first undulated ribbon-like spring 231 is in contact with the retainer portion 234a, so that it is prevented from moving in the axial direction by the bent portion 234b and prevented moving in the radial direction by the support portions 234c. A second contact portion 235 which is similar to the first contact portion 234 is formed at the $R_1$ end portion of the coupling member 233. The $R_1$ end portion of the second undulated ribbon-like spring 232 is retained at the second contact portion 235. The second contact portion 235 has the retainer portion 235a, the bent portion 235b and the support portions 235c in the same way as the first contact portion 234.

The retainer portion 212c is in contact with the $R_1$ end portion of the first undulated ribbon-like spring 231 at the inner circumferential side and the retainer portion 207b is in contact with it at the outer circumferential side. The retainer portion 212d is in contact with the $R_2$ end portion of the second undulated ribbon-like spring 232 at the inner circumferential side and the retainer portion 206a is in contact with it at the outer circumferential side.

As mentioned above, only one of the pair of arcuate chambers 217 is shown in FIG. 15. However, the arrangement of the springs 231 and 232 and the coupling member 233 in the other arcuate chamber 217 is symmetrical. Specifically, the first contact portions 234 are adjacent to each other at one position and the contact portions 235 are adjacent to each other at the opposite position 180° form the first contact portions 234.

The operation will now be explained.

A torque which has been input into the first flywheel 201 from the crankshaft on the engine side is transmitted to the first undulated ribbon-like springs 231 through the input plate 206 and the facing plate 207 and is further transmitted to the output plate 212 through the coupling members 233 and the second undulated ribbon-like spring 232 up to the second flywheel 203.

When the torsional vibration is input into the flywheel assembly, the first undulated ribbon-like spring 231 and the second undulated ribbon-like spring 232 are repeatedly compressed, so that the viscous fluid passes through among the first and second undulated ribbon-like springs 231 and 232 and the fluid chamber 217. The viscous resistance generated at this time serves to attenuate the torsional vibration.

When the undulated ribbon-like springs 231 and 232 are compressed, the opening angle of each lever portion 221 is decreased so that a bending moment is applied to the associated ring portion 220. In this case, the lever portion 221 is elastically deformed about the open ring portion 223. Then, the bending moment is distributed uniformly in the longitudinal direction in the lever portion 221, and at the same time, an elastic energy is dispersedly accumulated in the plurality of ring portions 220.

In this case, the torsional characteristics are determined by the torsional rigidity of the first and second undulated ribbon-like springs 231 and 232. Namely, in the small displacement angle range where the gap $S_2$ is provided in the open ring portion 223, the ring portions 220 and the lever portions 221 are elastically deformed in the same direction about the outer circumferential portions of the ring portions 220 of the first and second undulated ribbon-like springs 231 and 232. At this time, the torsional rigidity is small. When the displacement angle is increased, the gap $S_2$ becomes zero and the elastic energy is accumulated in the ring portions 220 about the open ring portions 223. Accordingly, the torsional rigidity is increased.

In this embodiment, the first and second undulated ribbon-like springs 231 and 232 are connected in series with each other through the coupling members 233. As a result, the overall rigidity is smaller than the conventional one. Accordingly, it is possible to ensure a larger displacement angle than the conventional one. As a result, it is possible to improve the torsional vibration attenuation characteristics.

Eighth Embodiment

Figure 18:
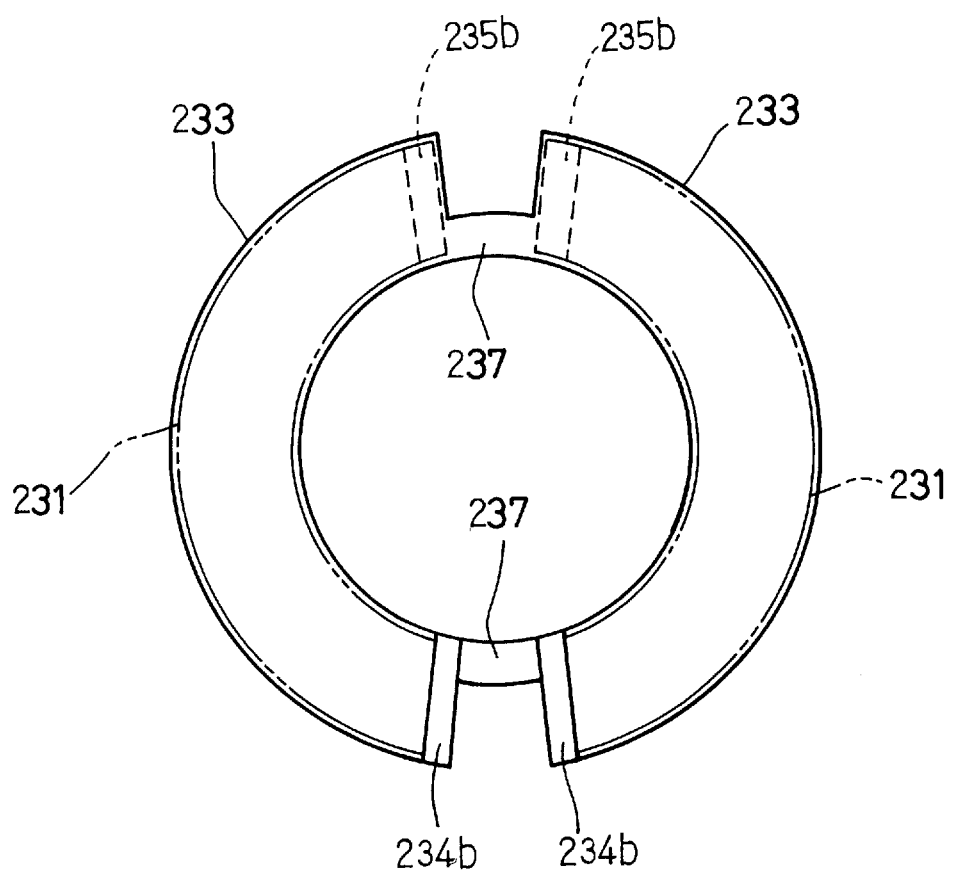
FIG. 18 is a plan view showing a pair of the coupling members according to an eighth embodiment of the present invention.

Both ends of the coupling members 233 shown in FIG. 18 are fixed by the coupling members 237. For this reason, a pair of coupling members 233 are rotated in a one-piece manner. As a result, even if a centrifugal force is applied to the coupling members 233, the radially outward movement of the coupling members 233 is limited. In other words, the coupling members 233 would hardly be in contact with the outer circumferential sleeve portion 207a. For this reason, the frictional resistance would hardly be generated between the two components.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claim:

1. A damper mechanism comprising:

an input plate;

an output plate coupled to said input plate for limited rotary displacement therewith, said input plate and said output plate at least partially defining an annular chamber;

an undulated ribbon-like spring disposed in said annular chamber, said undulated ribbon-like spring disposed between said input and output plates damping vibrations therebetween in response to relative rotary displacement between said input and output plates;

a pair of opposing annular plates, said pair of plates disposed within said annular chamber with said undulated ribbon-like spring positioned therebetween; and at least one pin extending through a portion of said undulated ribbon-like spring and said pair of plates for restraining radially outward movement of said undulated ribbon-like spring limiting contact between said undulated ribbon-like spring and a circumferentially outer surface of said annular chamber in response to centrifugal forces and compressive forces acting on said undulated ribbon-like spring.

2. A damper mechanism comprising:

an input plate;

an output plate coupled to said input plate for limited rotary displacement therewith, said input plate and said output plate at least partially defining an annular chamber;

an undulated ribbon-like spring disposed in said annular chamber, said undulated ribbon-like spring disposed between said input and output plates damping vibrations therebetween in response to relative rotary displacement between said input and output plates;

a pair of opposing annular plates, said pair of plates disposed within said annular chamber with said undulated ribbon-like spring positioned therebetween;

said undulated ribbon-like spring comprising a single elongated strip of material shaped to form a plurality of first ring portions, second ring portions and a plurality of lever portions, said lever portions extending between said first and second ring portions, said undulated ribbon-like spring being arcuately shaped to conform to a shape of said annular chamber such that said first ring portions generally define an inner circumferential edge of said undulated ribbon-like spring and each of said second ring portions generally define an outer circumferential edge of said undulated ribbon-like spring; and at least one pin extending through said undulated ribbon-like spring and extending through said pair of plates such that said pin engages a radially outer side of one of said first ring portions between adjacent ones of said lever portions thus restraining radially outward movement of said undulated ribbon-like spring thereby limiting contact between said undulated ribbon-like spring and a circumferentially outer surface of said annular chamber in response to centrifugal forces and compressive forces acting on said undulated ribbon-like spring.

3. The damper mechanism as in claim 2 wherein an axial width of said undulated ribbon-like spring is generally equal to or slightly less than an axial width of said annular chamber.

4. The damper mechanism as in claim 2 wherein a radial width of said undulated ribbon-like spring is slightly less than a radial width said annular chamber.

* * * * *